(12) United States Patent
Sweet et al.

(10) Patent No.: US 10,946,740 B2
(45) Date of Patent: Mar. 16, 2021

(54) CENTRAL CONTROL HUB FOR SEMI-AUTONOMOUS ELECTRIC VEHICLES

(71) Applicant: Panasonic Automotive Systems Company of America, division of Panasonic Corporation of North America, Peachtree City, GA (US)

(72) Inventors: Benjamin David Sweet, West Bloomfield, MI (US); Padmanaban Kanagaraj, Farmington Hills, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 156 days.

(21) Appl. No.: 16/259,695

(22) Filed: Jan. 28, 2019

(65) Prior Publication Data

US 2019/0248236 A1 Aug. 15, 2019

Related U.S. Application Data

(60) Provisional application No. 62/626,769, filed on Feb. 6, 2018.

(51) Int. Cl.
*B62D 1/18* (2006.01)
*B60K 26/02* (2006.01)
(Continued)

(52) U.S. Cl.
CPC ............. *B60K 26/02* (2013.01); *B60K 35/00* (2013.01); *B60N 2/005* (2013.01); *B60N 2/14* (2013.01); *B60T 7/042* (2013.01); *B60T 7/06* (2013.01); *B62D 1/02* (2013.01); *B62D 1/18* (2013.01); *G05G 13/00* (2013.01);
(Continued)

(58) Field of Classification Search
CPC .......... B60K 2370/73; B60K 2370/733; B60K 2370/739; B60K 2026/024; B60K 35/00; B62D 1/18; B60N 2/005
See application file for complete search history.

(56) References Cited

U.S. PATENT DOCUMENTS 6,857,498 B2 * 2/2005 Vitale .................... B60K 37/00
180/326
2002/0017410 A1 * 2/2002 Larsson ................. B60K 37/00
180/90
(Continued)

FOREIGN PATENT DOCUMENTS

JP 62-67834 U * 4/1987 ............... B60N 1/04

OTHER PUBLICATIONS

Unknown, Unknown, Apr. 27, 1987, JPO, JP 62-68734 U, Machine Translation of Description (Year: 1987).*

*Primary Examiner* — James A English
(74) *Attorney, Agent, or Firm* — Laurence S. Roach, Esq.

(57) ABSTRACT

A motor vehicle includes a plurality of seats. Each seat receives a respective human occupant of the motor vehicle. A movable driver control interface enables a human occupant to drive the motor vehicle. A positioning mechanism is coupled to the driver control interface and enables a human occupant to move the driver control interface to a position in front of any one of the seats such that any one of the human occupants may use the driver control interface to drive the motor vehicle.

21 Claims, 4 Drawing Sheets

(51) Int. Cl.
- *B60N 2/14* (2006.01)
- *G05G 13/00* (2006.01)
- *B60K 35/00* (2006.01)
- *B60T 7/06* (2006.01)
- *B60N 2/005* (2006.01)
- *B60T 7/04* (2006.01)
- *B62D 1/02* (2006.01)
- *B60T 7/14* (2006.01)

(52) U.S. Cl.
CPC .... *B60K 2026/024* (2013.01); *B60K 2370/67* (2019.05); *B60T 7/14* (2013.01); *G05G 2700/02* (2013.01)

(56) References Cited

U.S. PATENT DOCUMENTS

| | | | |
|---|---|---|---|
| 2003/0125873 A1* | 7/2003 | Yamaguchi | B60K 35/00 701/400 |
| 2003/0141736 A1* | 7/2003 | Chernoff | B60N 2/14 296/65.01 |
| 2005/0283288 A1* | 12/2005 | Howell | B62D 1/18 701/41 |
| 2009/0152907 A1* | 6/2009 | Lee | B60N 2/14 297/1 |
| 2017/0028876 A1* | 2/2017 | Yamada | B60N 2/06 |
| 2017/0028987 A1* | 2/2017 | Yamada | B60N 2/062 |
| 2019/0168806 A1* | 6/2019 | Liu | B62D 5/04 |
| 2020/0254906 A1* | 8/2020 | Luchner | B60N 2/0745 |

* cited by examiner

CENTRAL CONTROL HUB FOR SEMI-AUTONOMOUS ELECTRIC VEHICLES

CROSS-REFERENCE TO RELATED APPLICATION

This application claims benefit of U.S. Provisional Application No. 62/626,769 filed on Feb. 6, 2018, which the disclosure of which is hereby incorporated by reference in its entirety for all purposes.

FIELD OF THE INVENTION

The disclosure relates to positioning of driver controls in a motor vehicle, and, more particularly, to positioning of driver controls in a semi-autonomous electric vehicle.

BACKGROUND OF THE INVENTION

A driver can become distracted or too tired to continue driving. However, in order to switch drivers, the vehicle must stop so that the occupants can get out of the vehicle and switch their seat positions.

SUMMARY

With electric drive and electric steer vehicles, the driver control interfaces, such as for the steering wheel, the accelerator, and the brake pedal, do not need a mechanical connection to the actuators that they control. Thus, according to the invention, the driver control interfaces can be relocated from the traditional "driver seat" position.

Since the driver control interfaces may be positioned arbitrarily, the "front" of the vehicle is not a fixed reference. For example, a driver facing the "rear" of the vehicle and driving "backward" is in fact driving forward.

According to one embodiment of the invention, the driver control interfaces, such as for the steering wheel, the accelerator, and the brake pedal, are located on a hub that is centrally located within the passenger compartment. Thus, the hub can be accessed by any vehicle occupant who is facing the center of the passenger compartment. Accordingly, the invention may enable any vehicle occupant to drive the vehicle.

In order to present the "forward" view (e.g., the view in the direction in which the vehicle is primarily traveling) to the centrally-facing driver, the windows and/or mirrors may be replaced with video displays that present the image as if the driver were facing forward. Additional displays may be provided to present other views to the driver to enable safe and effective driving.

In one embodiment, if either end of the vehicle can be the leading end while driving (i.e., if the wheels may be rotated in either rotational direction while the vehicle is being driven in the "drive" gear), then the vehicle may travel "forward" in whichever direction the driver is facing. If the driving task is switched from an occupant facing in one direction to an occupant facing in the opposite direction, the vehicle may need to leave the road and switch its driving direction by driving into a parking lot, by pulling into a driveway, or by driving onto a stretch of road on which there are no other vehicles being driven. The vehicle may come to a stop in order to switch its driving direction.

In one embodiment, the invention comprises a motor vehicle including a plurality of seats. Each seat receives a respective human occupant of the motor vehicle. A movable driver control interface enables a human occupant to drive the motor vehicle. A positioning mechanism is coupled to the driver control interface and enables a human occupant to move the driver control interface to a position in front of any one of the seats such that any one of the human occupants may use the driver control interface to drive the motor vehicle.

In another embodiment, the invention comprises a method of enabling a motor vehicle to be driven, including providing a plurality of seats within a passenger compartment of the motor vehicle. Each seat receives and is set upon by a respective human occupant of the motor vehicle. A movable driver control interface is provided within the passenger compartment of the motor vehicle. The movable driver control interface enables a human occupant to drive the motor vehicle. A human occupant is enabled to move the driver control interface to a position in front of any one of the seats such that any one of the human occupants may use the driver control interface to drive the motor vehicle.

In yet another embodiment, the invention comprises a motor vehicle including a plurality of seats. Each seat receives a respective human occupant of the motor vehicle. A movable driver control interface enables a human occupant to drive the motor vehicle. A closed loop track is coupled to the driver control interface and enables a human occupant to move the driver control interface to a position in front of any one of the seats such that any one of the human occupants may use the driver control interface to drive the motor vehicle.

An advantage of the present invention is that it may enable a motor vehicle to be driven from any seat within the passenger compartment of the vehicle.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
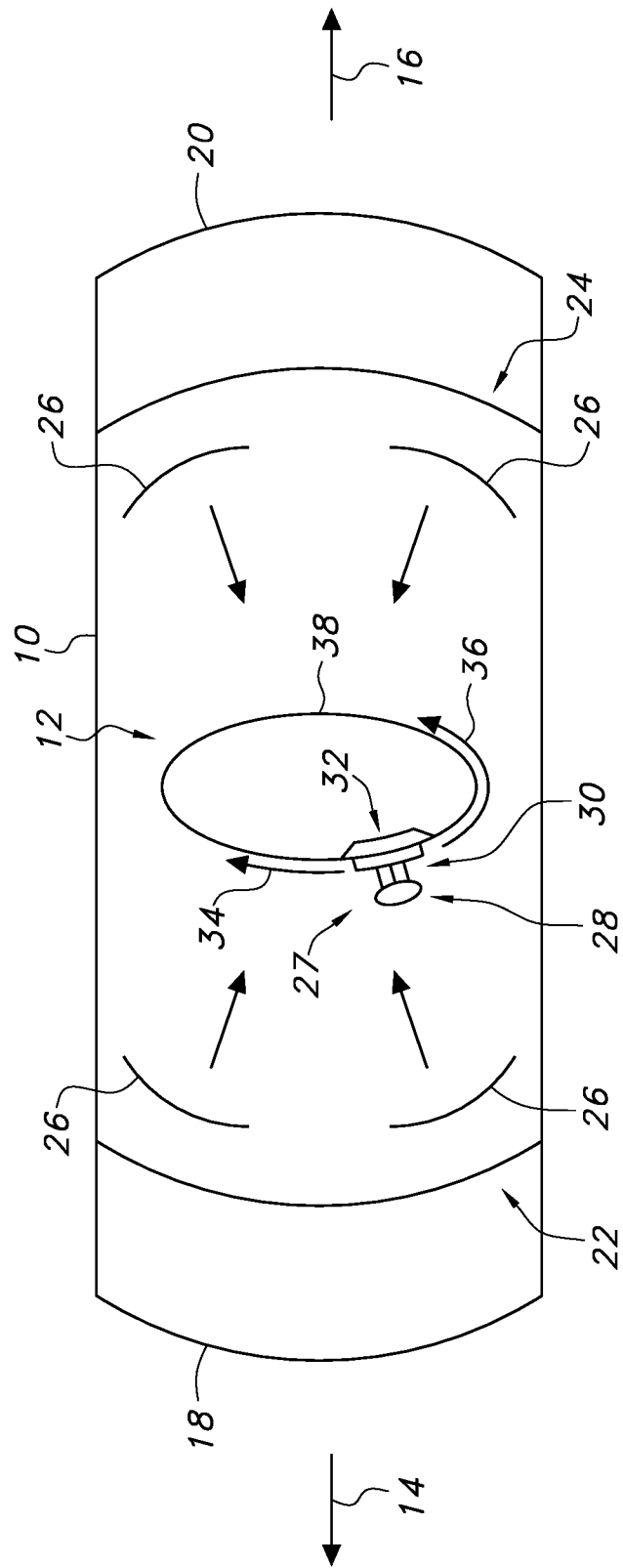
FIG. 1 is a schematic diagram of one example embodiment of a semi-autonomous electric motor vehicle including a central control hub arrangement of the present invention.

FIG. 1 illustrates one example embodiment of a motor vehicle 10 of the present invention including a central control hub arrangement 12. Vehicle 10 may be an electric and/or semi-autonomous vehicle. All four wheels of vehicle 10 may be steerable such that vehicle 10 may be safely driven at highway speed of 60 mph or more in either of two opposite directions 14, 16. Vehicle 10 includes two opposite ends 18, 20 each having a storage space (e.g., a truck) and/or a service space (e.g., under a hood) in which an engine, motor and other serviceable components of vehicle 10 may be located. Next to each opposite end 18, 20 is a respective windshield 22, 24. Vehicle 10 includes four occupant seats 26, each of which may face toward, and enable a respective human occupant to face toward, and a central space within the passenger compartment in which central control hub arrangement 12 is located.

Arrangement 12 includes a driver control interface 27 having a steering wheel 28, control pedals 30, such as an accelerator pedal and a brake pedal, and a display screen 32. Driver control interface 27 may be carried in either of two opposite rotational directions 34, 36 on an oval, circular, or otherwise closed-loop track 38. Track 38 may be supported by a floor, roof and/or side walls that define the passenger compartment of vehicle 10, for example. Interface 27 may be manually moved along track 38, or may be moved by an electrically-powered actuator (not shown).

By virtue of being movable along track 38, interface 27 may be selectively positionable in front of any one of seats 26, and in front of the human occupants sitting in seats 26, such that any one of the human occupants may operate interface 27 and serve as the driver of vehicle 10. Arrangement 12 may include a mechanical and/or electrical mechanism (not shown) for stably retaining interface 27 in position in front of the human occupant who is serving as the driver. This mechanism may be released when the driving task is switched to another occupant.

Display screen 32, possibly supplemented by other display screens (not shown) which show views analogous to those of conventional rearview and sideview mirrors, may enable any of the occupants to drive vehicle 10 while the occupant is facing in the direction that is opposite to the direction in which vehicle 10 is traveling. However, it is also possible for vehicle 10 to turn around (i.e., switch which end 18, 20 of vehicle is leading and which is trailing) when the driver is switched if necessary for the driver to face in the direction in which vehicle 10 is traveling, which may make the physical forces felt by the driver while driving seem more compatible and/or consistent with the views that he sees on the display screens.

Figure 2:
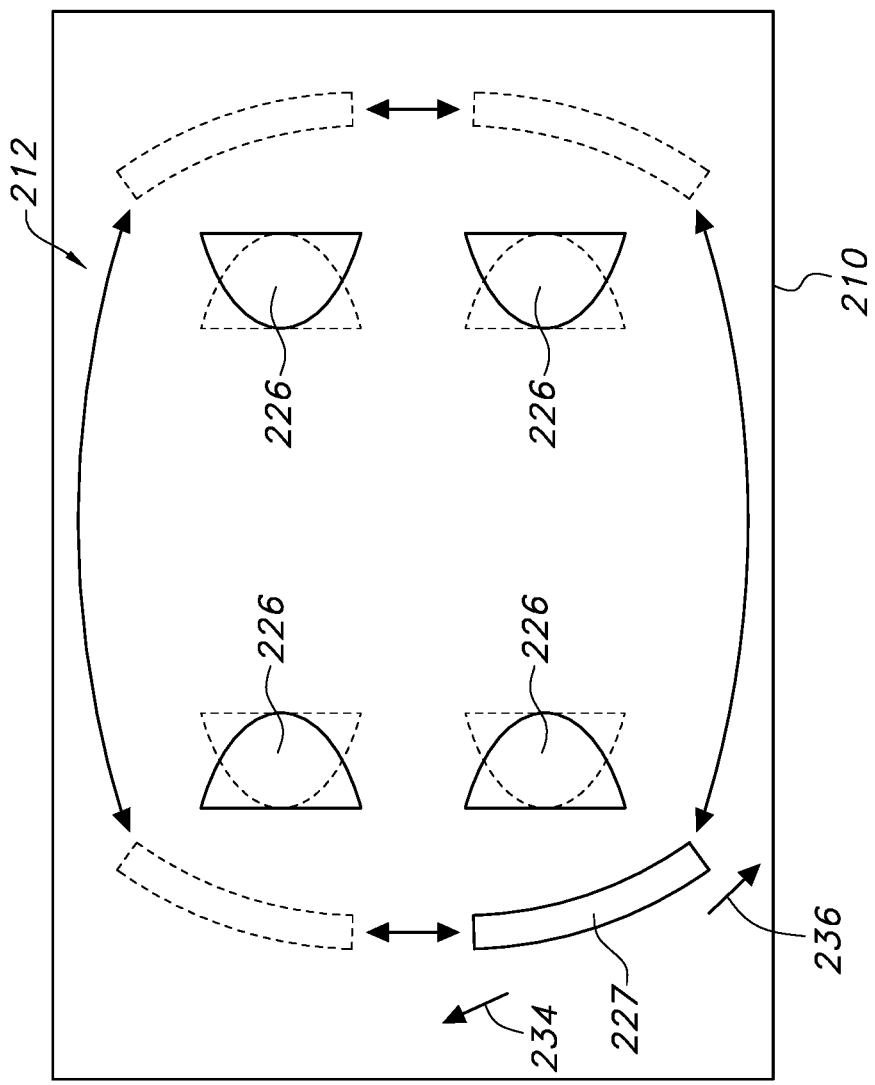
FIG. 2 is a schematic diagram of an example embodiment of a semi-autonomous electric motor vehicle including a re-positionable driver control interface arrangement of the present invention.

FIG. 2 illustrates an example embodiment of a motor vehicle 210 including a re-positionable driver control interface arrangement 212 of the present invention. Motor vehicle 210 may be a semi-autonomous vehicle and/or an electric vehicle.

Arrangement 212 includes a driver control interface 227 having a steering wheel, control pedals, such as an accelerator pedal and a brake pedal, and one or more display screens (not shown). Driver control interface 227 may be carried in either of two opposite rotational directions 234, 236 on an oval, circular, or otherwise closed-loop track (not shown). The track may be supported by a floor, roof and/or side walls that define the passenger compartment of vehicle 210, for example. Interface 227 may be manually moved along the track, or may be moved by an electrically-powered actuator (not shown).

By virtue of being movable along the track, interface 227 may be selectively positionable in front of any one of seats 226, and in front of the human occupants sitting in seats 226, such that any one of the human occupants may operate interface 227 and serve as the driver of vehicle 210. Each seat 226 may be independently and selectively pivotable between an outwardly facing position, shown in solid lines in FIG. 2, and an inwardly facing position, shown in dashed lines in FIG. 2. The driver's seat may be placed in the outwardly facing position so that the driver can face interface 227. The positions of the other seats 226 other than the driver's may be arbitrary, and may even be placed in intermediate positions between the outwardly facing and inwardly facing positions.

Arrangement 212 may include a mechanical and/or electrical mechanism (not shown) for stably retaining interface 227 in position in front of the human occupant who is serving as the driver. This mechanism may be released when the driving task is switched to another occupant.

Other features of vehicle 210 may be substantially similar to those of vehicle 10, and thus are not described in detail herein in order to avoid needless repetition.

Figure 3:
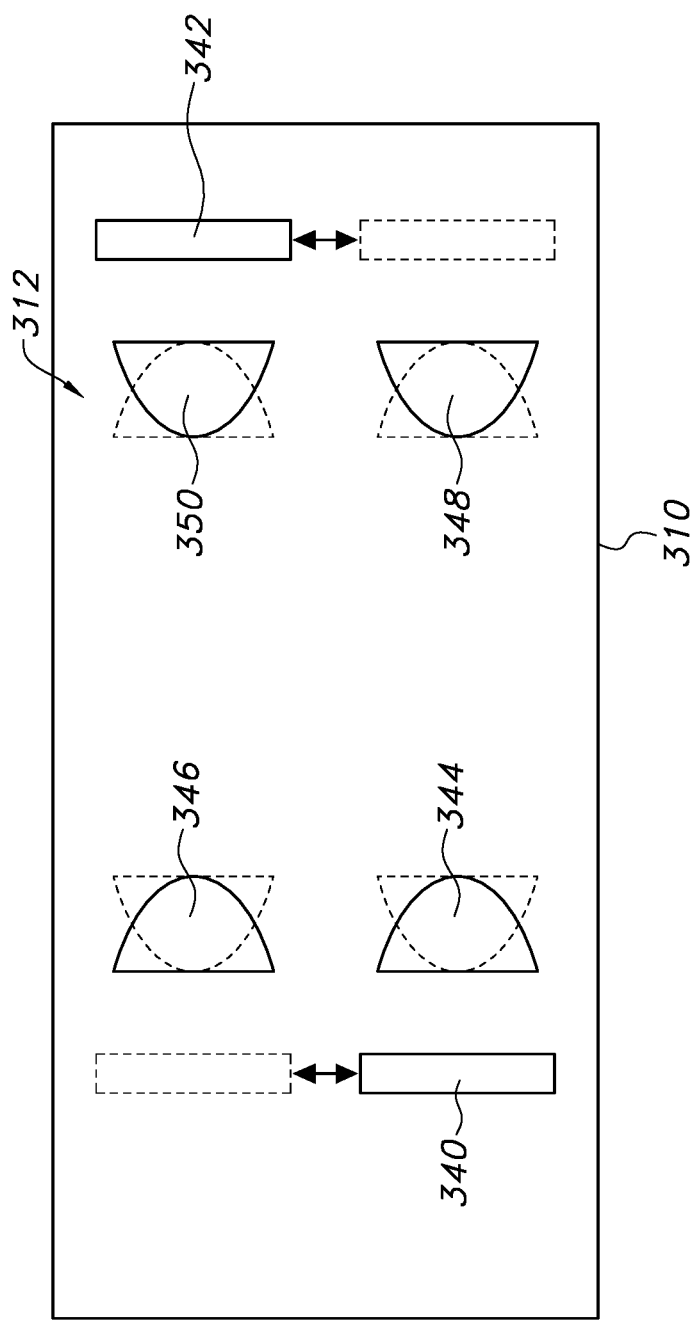
FIG. 3 is a schematic diagram of another example embodiment of a semi-autonomous electric motor vehicle including a re-positionable driver control interface arrangement of the present invention.

FIG. 3 illustrates another example embodiment of a motor vehicle 310 including a re-positionable driver control interface arrangement 312 of the present invention. Motor vehicle 310 may be a semi-autonomous vehicle and/or an electric vehicle.

Arrangement 312 includes two driver control interfaces 340, 342 each having a steering wheel, control pedals, such as an accelerator pedal and a brake pedal, and one or more display screens (not shown). Driver control interface 340 may be carried on a track (not shown) or by an articulating arm (not shown) between positions in front of two adjacent seats 344, 346. Similarly, driver control interface 342 may be carried on a track (not shown) or by an articulating arm (not shown) between positions in front of two adjacent seats 348, 350. Each of interfaces 340, 342 may be manually moved along the track or on the articulating arm, or may be moved by an electrically-powered actuator (not shown). There may be a switch (not shown) within the passenger compartment which controls which of interfaces 340, 342 is active and may be used for driving vehicle 310. The interface 340, 342 that is inactive and not in use for driving vehicle 310 may be stored in a roof, floor, door, instrument panel, or seat, for example.

By virtue of being movable along the tracks or by the articulating arms, interfaces 340, 342 may be selectively positionable in front of any one of seats 344, 346, 348, 350, and in front of the human occupants sitting in seats 344, 346, 348, 350, such that any one of the human occupants may operate an interface 340, 342 and serve as the driver of vehicle 310. Each seat 344, 346, 348, 350 may be independently and selectively pivotable between an outwardly facing position, shown in solid lines in FIG. 3, and an inwardly facing position, shown in dashed lines in FIG. 3. The driver's seat may be placed in the outwardly facing position so that the driver can face one of interfaces 340, 342. The positions of the other seats 344, 346, 348, 350 other than the driver's may be arbitrary, and may even be placed in intermediate positions between the outwardly facing and inwardly facing positions.

Arrangement 312 may include a mechanical and/or electrical mechanism (not shown) for stably retaining the active interface 340, 342 in position in front of the human occupant who is serving as the driver. This mechanism may be released when the driving task is switched to another occupant.

Other features of vehicle 310 may be substantially similar to those of vehicle 10, and thus are not described in detail herein in order to avoid needless repetition.

Another embodiment (not shown), is substantially similar to vehicle 310 except that there are four driver control interfaces, each associated with and positionable in front of a respective one of four seats in the vehicle. Thus, there is no need for any of the interfaces to be movable between seats. Each of the interfaces may be stowable when not in use.

Figure 4:
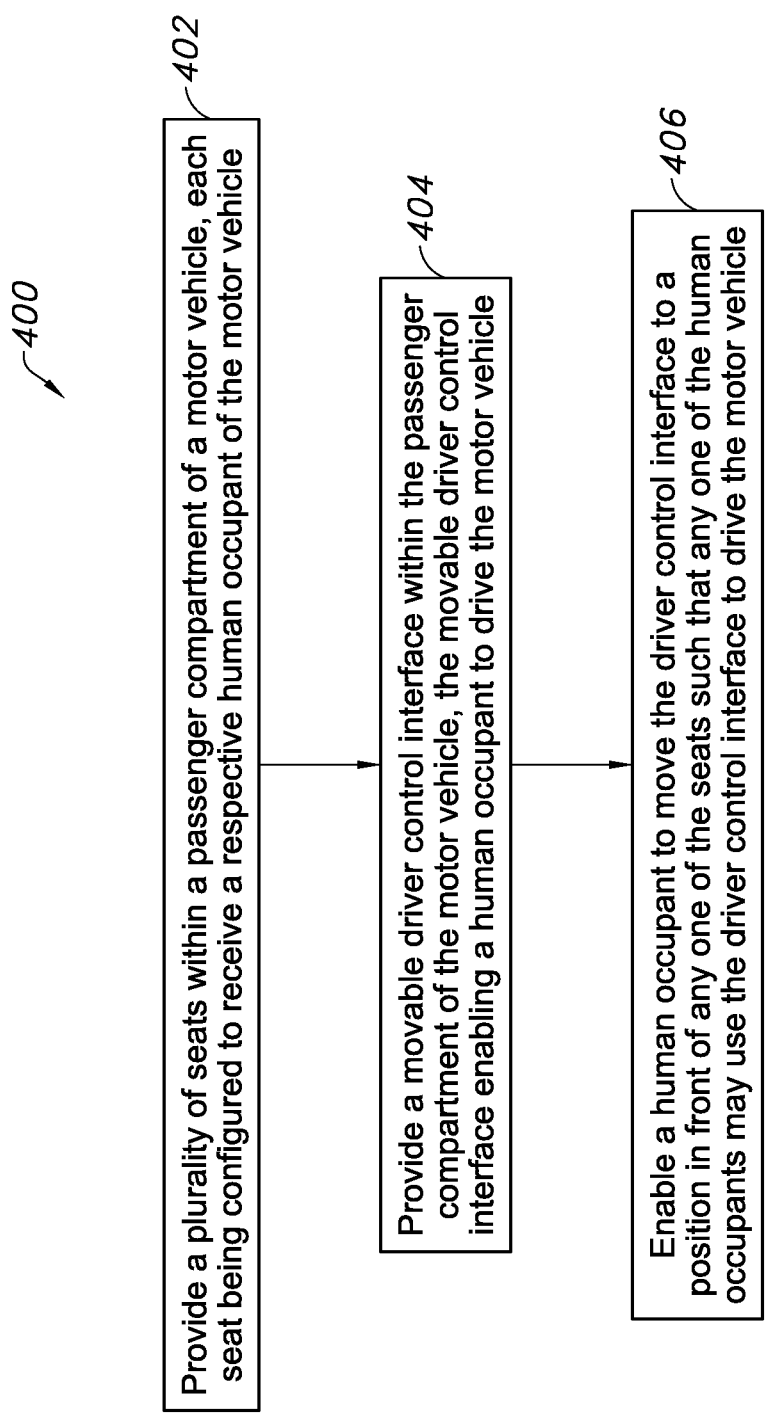
FIG. 4 is a flow chart of one embodiment of method of the present invention for enabling a motor vehicle to be driven.

FIG. 4 illustrates one embodiment of method 400 of the present invention for enabling a motor vehicle to be driven. In a first step 402, a plurality of seats are provided within a passenger compartment of the motor vehicle. Each seat is configured to receive a respective human occupant of the motor vehicle. For example, four occupant seats 26 are provided in vehicle 10.

In a next step 404 a movable driver control interface is provided within the passenger compartment of the motor vehicle. The movable driver control interface enables a human occupant to drive the motor vehicle. For example, driver control interface 27 may be carried in either of two opposite rotational directions 34, 36 on an oval, circular, or otherwise closed-loop track 38. Driver control interface 27 includes a steering wheel 28, control pedals 30, such as an accelerator pedal and a brake pedal, and a display screen 32, allow which enable a human occupant to drive vehicle 10.

In a final step 406, a human occupant is enabled to move the driver control interface to a position in front of any one of the seats such that any one of the human occupants may use the driver control interface to drive the motor vehicle. For example, by virtue of being manually movable along track 38, interface 27 may be selectively positionable by a human occupant in front of any one of seats 26, and in front of the human occupants sitting in seats 26, such that any one of the human occupants may operate interface 27 and serve as the driver of vehicle 10.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A motor vehicle, comprising:
   a plurality of seats, each seat being configured to receive a respective human occupant of the motor vehicle;
   a movable driver control interface configured to enable a human occupant to drive the motor vehicle; and
   a positioning mechanism coupled to the driver control interface and configured to enable a human occupant to move the driver control interface to a position in front of any one of the seats such that any one of the human occupants may use the driver control interface to drive the motor vehicle, wherein the positioning mechanism includes a closed loop track.

2. The motor vehicle of claim 1 wherein the movable driver control interface includes a steering wheel, an accelerometer pedal, a brake pedal, and at least one display screen.

3. The motor vehicle of claim 1 wherein the driver control interface is configured to be movable in both rotational directions along the closed loop track.

4. The motor vehicle of claim 3 wherein the closed loop track is substantially horizontally oriented and oval.

5. The motor vehicle of claim 1 further comprising four wheels, each said wheel being steerable.

6. A motor vehicle, comprising:
   a plurality of seats, each seat being configured to:
      receive a respective human occupant of the motor vehicle; and
      face toward a center of a passenger compartment of the motor vehicle;
   a movable driver control interface configured to enable a human occupant to drive the motor vehicle; and
   a positioning mechanism coupled to the driver control interface and configured to enable a human occupant to move the driver control interface to a position in front of any one of the seats such that any one of the human occupants may use the driver control interface to drive the motor vehicle.

7. The motor vehicle of claim 6 wherein the movable driver control interface includes a steering wheel, an accelerometer pedal, a brake pedal, and at least one display screen.

8. The motor vehicle of claim 6 further comprising four wheels, each said wheel being steerable.

9. A method of enabling a motor vehicle to be driven, the method comprising the following steps:
   providing a plurality of seats within a passenger compartment of the motor vehicle, each seat being configured to receive a respective human occupant of the motor vehicle;
   providing a movable driver control interface within the passenger compartment of the motor vehicle, the movable driver control interface being configured to enable a human occupant to drive the motor vehicle; and
   enabling a human occupant to move the driver control interface to a position in front of any one of the seats such that any one of the human occupants may use the driver control interface to drive the motor vehicle, wherein the enabling step includes enabling the human occupant to move the driver control interface along a closed loop track.

10. The method of claim 9 wherein the movable driver control interface includes a steering wheel, an accelerometer pedal, a brake pedal, and at least one display screen.

11. The method of claim 9 wherein the driver control interface is movable in both rotational directions along the closed loop track.

12. The method of claim 9 wherein the closed loop track is substantially horizontally oriented and oval.

13. The method of claim 9 further comprising:
   providing the motor vehicle with four wheels; and
   using the movable driver control interface to steer each of the wheels.

14. A method of enabling a motor vehicle to be driven, the method comprising the following steps:
   providing a plurality of seats within a passenger compartment of the motor vehicle, each seat being configured to receive a respective human occupant of the motor vehicle, wherein the seats can be turned so that they face toward a center of the passenger compartment of the motor vehicle;
   providing a movable driver control interface within the passenger compartment of the motor vehicle, the movable driver control interface being configured to enable a human occupant to drive the motor vehicle; and
   enabling a human occupant to move the driver control interface to a position in front of any one of the seats such that any one of the human occupants may use the driver control interface to drive the motor vehicle.

15. A motor vehicle, comprising:
   a plurality of seats, each seat being configured to receive a respective human occupant of the motor vehicle;
   a movable driver control interface configured to enable a human occupant to drive the motor vehicle; and
   a closed loop track coupled to the driver control interface and configured to enable a human occupant to move the driver control interface to a position in front of any one of the seats such that any one of the human occupants may use the driver control interface to drive the motor vehicle.

16. The motor vehicle of claim 15 wherein the movable driver control interface includes a steering wheel, an accelerometer pedal, a brake pedal, at least one display screen, and a pushbutton or gear stick for changing a gear of the motor vehicle.

17. The motor vehicle of claim 15 wherein the motor vehicle comprises an electric vehicle and/or a semi-autonomous vehicle.

18. The motor vehicle of claim 15 wherein the driver control interface is configured to be movable in both a clockwise rotational direction and a counterclockwise rotational direction along the closed loop track.

19. The motor vehicle of claim 15 wherein the closed loop track is substantially horizontally oriented and oval.

20. The motor vehicle of claim 15 further comprising four wheels, each said wheel being steerable such that either of two opposite ends of the motor vehicle may be the leading edge of the motor vehicle while the motor vehicle is being driven.

21. The motor vehicle of claim 15 wherein the seats are each configured to face toward a center of a passenger compartment of the motor vehicle.

* * * * *